United States Patent Office 2,942,700
Patented June 28, 1960

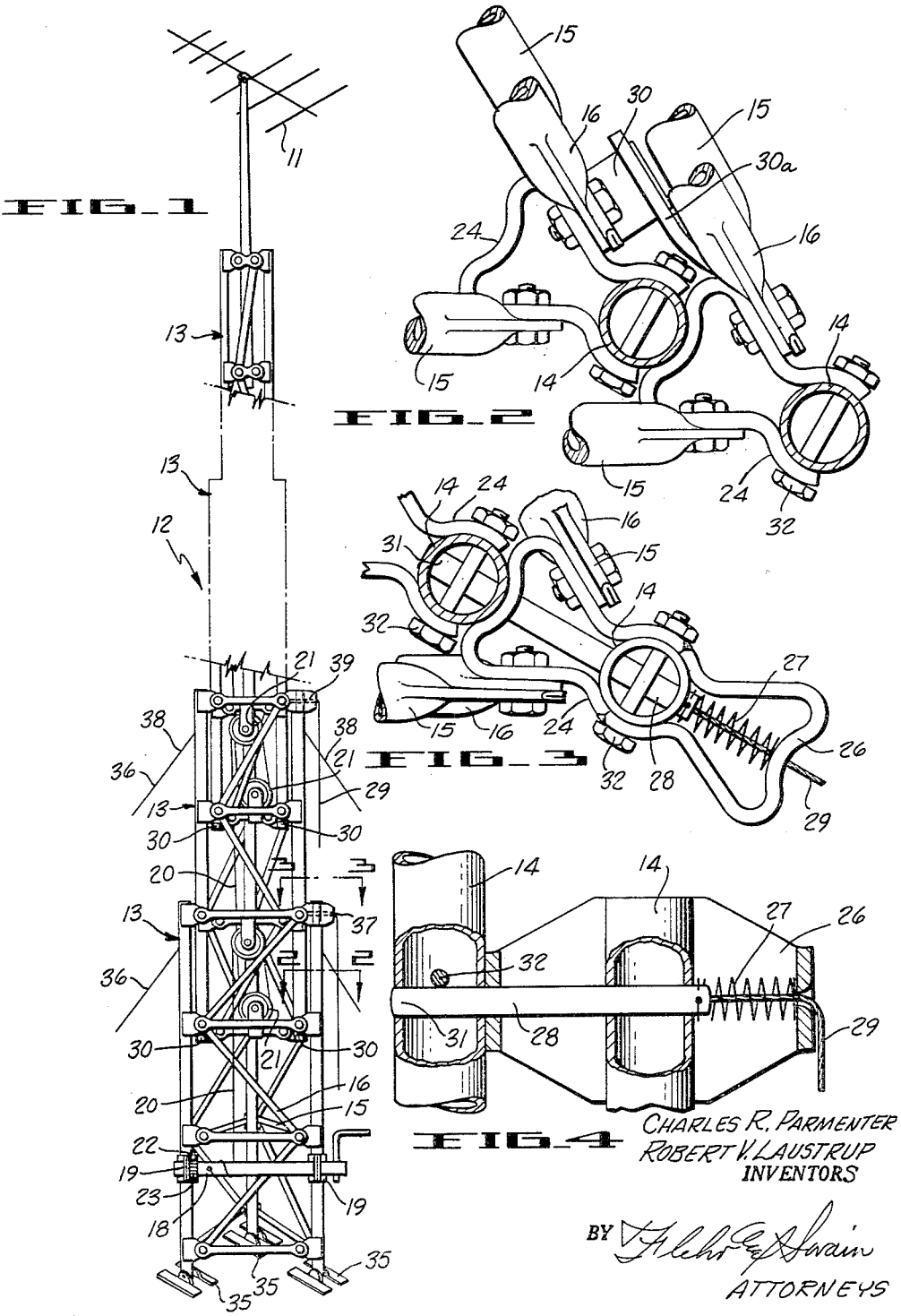

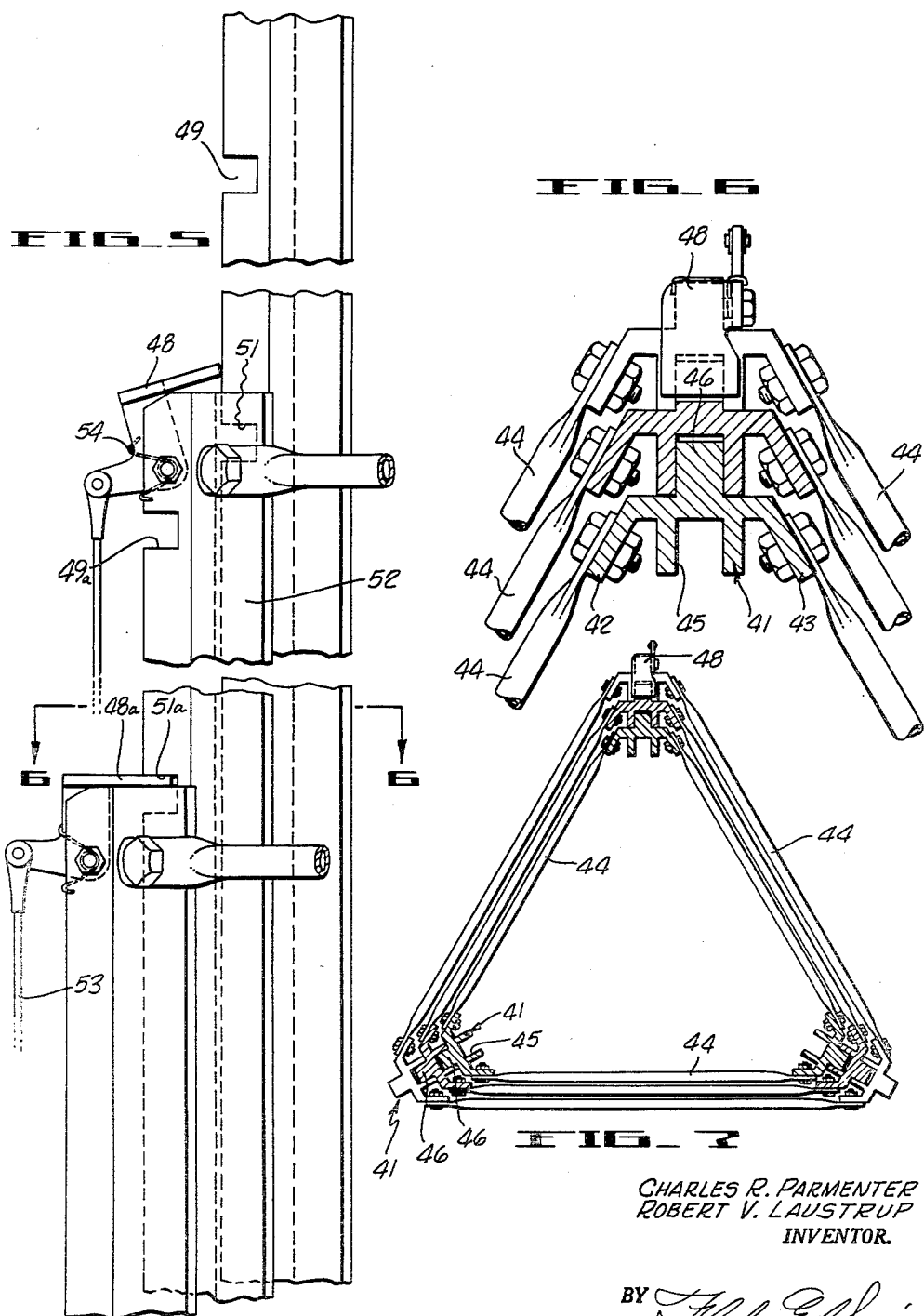

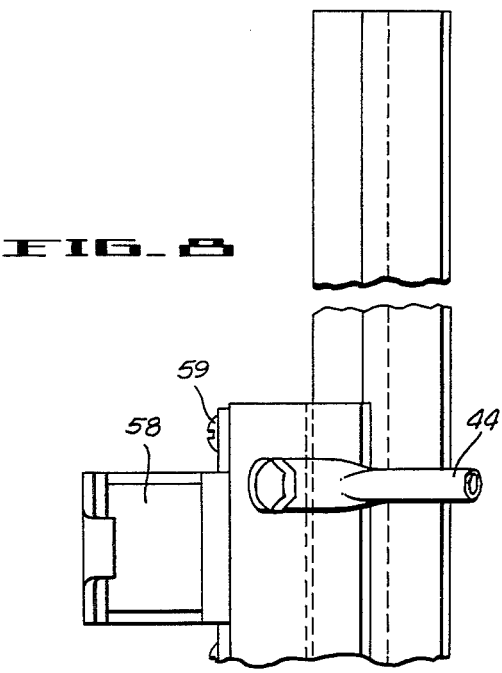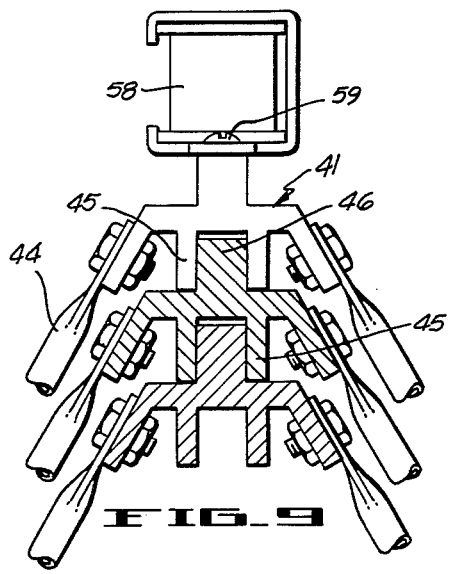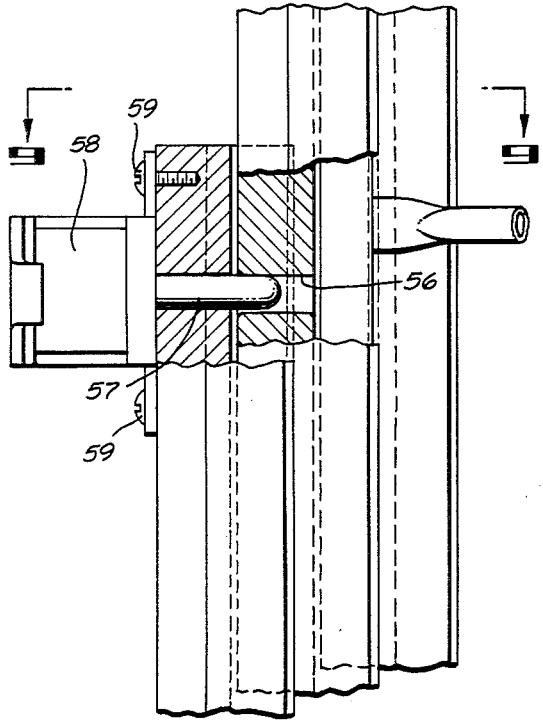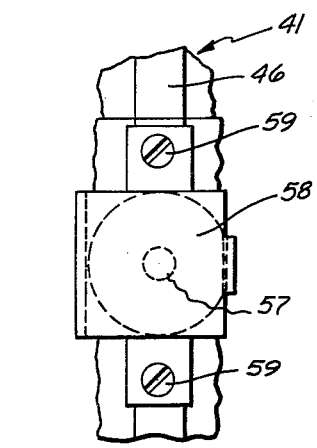
CHARLES R. PARMENTER
ROBERT V. LAUSTRUP
INVENTORS

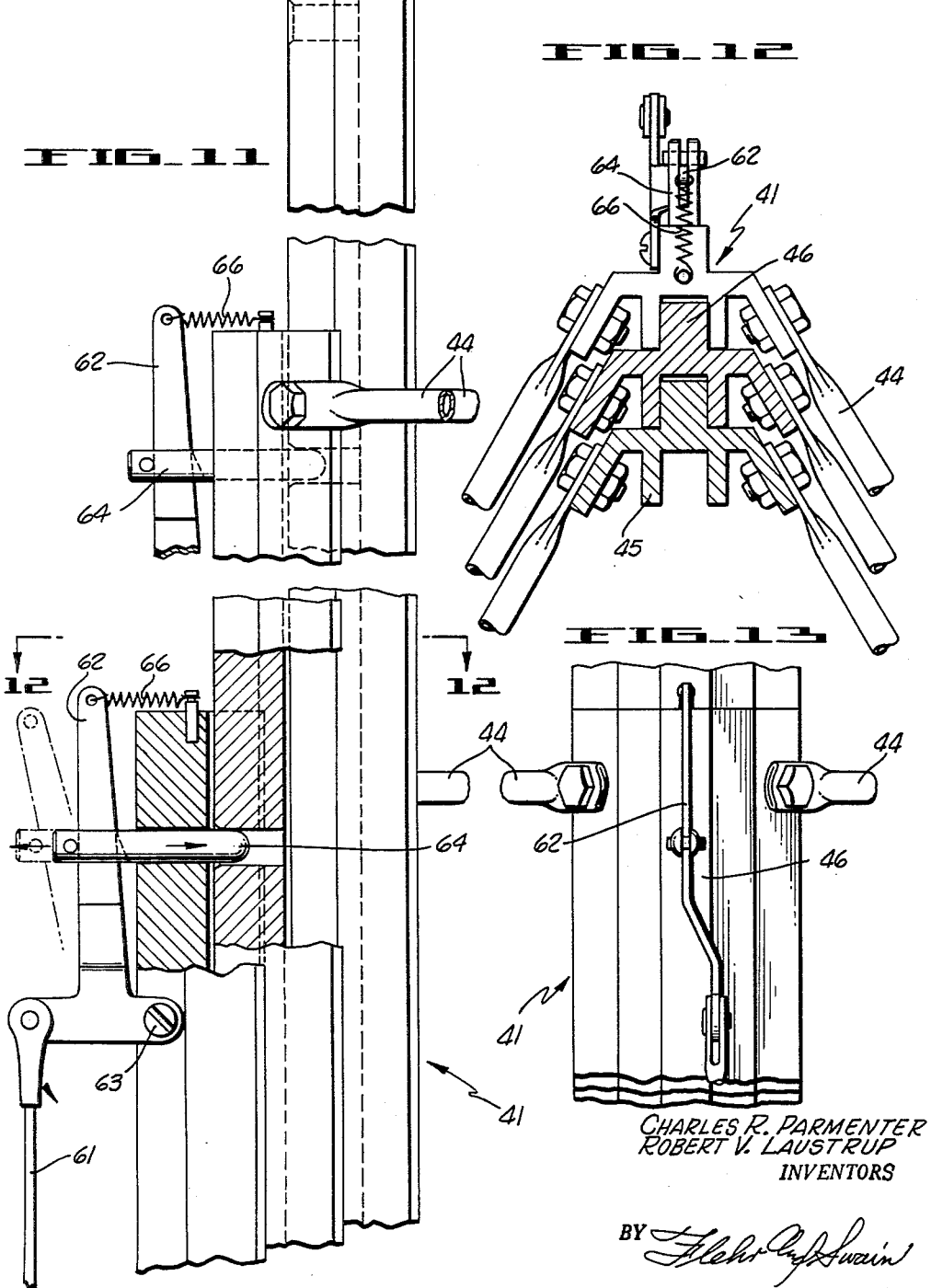

2,942,700

TELESCOPING TOWER

Charles R. Parmenter, Belmont, and Robert V. Laustrup, Woodside, Calif., assignors to Alpar Manufacturing Company, Redwood City, Calif., a corporation of California Filed May 27, 1955, Ser. No. 511,568

1 Claim. (Cl. 189—14)

This invention relates generally to telescoping towers, and more particularly to telescoping towers of the type in which the various sections may be extended and telescoped in any desired order.

In general, prior art telescoping towers are extended by raising the various sections from the inside out, i.e., extending the inner sections which form the top of the tower first. As a result, the towers must be fully extended before the guy lines may be secured. Several men are generally required to hold the guy lines while the tower is being raised in order to stabilize the tower. After the tower is fully raised the guy wires are permanently secured. When the tower is lowered, the sections are nested in the reverse order, from the outside in. Again, several men are required to steady the tower as it is telescoped.

If the tower is used for survey work, e.g., by television installers, public utility services, and government agencies, where it is necessary to locate an antenna at various heights, several men are required to guy the tower as the survey is made. It is apparent that the number of men required greatly increases the cost of a survey and that in some instances the cost will become prohibitive. An excessive amount of time is also required to erect a tower of this type.

The time and personnel required are of great importance where the tower is used to establish emergency communications, e.g., in fire fighting, disaster situations and civil defense operations.

Another disadvantage with prior art towers is that when the towers are telescoped for shipping, the sections are not locked together. The sections must, therefore, be secured by suitable means to prevent extension during shipping.

It is a general object of the invention to provide an improved telescoping tower.

It is another object of the present invention to provide a telescoping tower in which the sections may be extended and telescoped in any desired order.

It is a further object of the present invention to provide a telescoping tower which may be extended from the outside in whereby the tower may be securely guyed as each section is extended.

It is another object of the present invention to provide a telescoping tower which may be easily and rapidly extended and telescoped by a minimum number of persons and in minimum time.

These and other objects of our invention will be more clearly apparent from the following description taken in conjunction with the accompanying drawings.

Referring to the drawings:

Figure 1 is an elevational view of a tower constructed in accordance with our invention;

Figure 2 is a partial section taken along the line 2—2 of Figure 1;

Figure 3 is a partial section taken along the line 3—3 of Figure 1;

Figure 4 is a side elevational view partly in section of the locking mechanism shown in Figure 3;

Figure 5 is an elevational view of a portion of another tower constructed in accordance with our invention;

Figure 6 is a sectional view taken along the line 6—6 of Figure 5;

Figure 7 shows a plurality of sections of the type illustrated in Figures 5 and 6 nested within one and other;

Figure 8 is an elevational view of a portion of another tower constructed in accordance with our invention.

Figure 9 is a sectional view taken along the line 9—9 of Figure 8;

Figure 10 shows a front elevational view of the solenoid employed in Figure 8;

Figure 11 shows a side elevational view of a portion of another tower constructed in accordance with our invention;

Figure 12 is a sectional view taken along the line 12—12 of Figure 11; and

Figure 13 is a front elevational view of the locking mechanism shown in Figure 11.

Generally, our tower comprises a plurality of sections adapted to telescope within one and other. Suitable means are provided for extending the sections. Locking means are associated with each of the sections and serve to lock adjacent sections in their telescoped and extended positions. Suitable means are also provided for controllably releasing the locking means whereby the sections may be extended and telescoped in any desired order.

Referring generally to Figure 1, an antenna 11 is shown supported by a tower 12. The tower comprises a plurality of telescoping sections 13. These sections are designed to incorporate sound structural engineering principles. For example, the towers shown employ a triangular cross section. The tubular upright members 14 are reinforced by a lattice work of tubular cross members 15 and diagonal members 16.

Suitable means are provided for extending or raising the tower. For example, the means may comprise a hydraulic lift or a windlass. For example, a windlass 18 is shown mounted between the brackets 19. A cable 20 engages the windlass 18 and passes over a plurality of pulleys 21. Thus, by operating the windlass, the cable serves to urge the pulleys together thereby raising the associated sections of the tower. A pawl 22 is mounted on one of the brackets 19 and engages a ratchet 23. The tower may be extended to any predetermined height and locked in position by the pawl and ratchet. The pawl and ratchet also serve to prevent telescoping if the handle is accidentally released while extending the tower.

Referring to Figure 2, cross and diagonal members 15 and 16 are shown. The inner vertical member 14 (the member 14 as viewed to the left in Figure 2) rides within the saddles 24 which are attached to the adjacent outer vertical members. The saddles are spaced along the vertical members whereby the adjacent inner section is continuously guided as it is extended and telescoped. This arrangement serves to make the tower rigid.

At the top of each section, with the exception of the innermost section, suitable locking means are provided. For example, the locking means may comprise a member 26 which is attached to the top of one of the vertical members 14. The member 26 serves to house the spring 27 which urges the pin 28 inward towards the adjacent inner section. A suitable cable 29 is attached to one end of the pin 28 and passes through the spring 27. The cable 29 is attached to a cord which drops to the ground. By pulling the cord, the cable 27 is pulled to retract the pin 28 against the force of the spring 27.

The adjacent inner vertical tubular section 14 is drilled to accommodate the end 31 of the pin. The accommodating hole is generally placed beneath the securing bolt 32 which secures the associated saddle to the vertical members 14. Thus if the vertical member is made of soft metal, the pin 31 will bear against the bolt or pin 32 thereby preventing tearing or enlarging of the opening due to the weight of the associated structure and antenna.

A similar hole is provided at the top of each section whereby when the sections are telescoped, the pin 31 engages this opening to thereby lock the sections in a telescoped position. The spring-loaded pin 28 automatically engages the adjacent hole thereby locking the various sections in position. This prevents accidentally cranking the tower out, i.e., extending the tower such a distance that the inner section travels out of the outer section. A pair of stops 30 are also provided at the bottom of each tower section. The stops 30 engage the arms 30a which are attached to the associated outer member. These stops serve as a safety feature. The bottom ends of the vertical members 14 of the outside section are provided with base plates 35. These plates provide means for attaching the tower to a base. The plates also simplify erection of the tower as will be presently described.

Assuming that a telescoped tower is lying horizontally, the following steps are required to erect the tower: first, guy cables 36 and 38 (and others as required) of suitable length are fastened to the top of each section. Secondly, two of the base plates 35 are secured to a suitable base. The end of the telescoped tower is then raised until the tower is vertical and the remaining base plate is secured to the base. Thus, the telescoped tower may be easily secured in place by one man. The outside section is guyed by means of the guy cables 36. The pin 37 which is located at the top of the outermost section is then retracted releasing the adjacent inner sections. Operation of the windlass 19 now serves to extend this section. When the section is fully extended, the pin will automatically engage the adjacent hole thereby locking the second section in its extended position. This section may then be guyed by means of guy cables 38. The pin 39 is then retracted thereby releasing the next section. Operation of the windlass will extend this section until the pin engages the accommodating hole. This section may then be guyed. The other sections are similarly raised.

If it is desired to survey at a height that is intermediate between the telescoped and extended position of any section, the pawl on the windlass is allowed to engage the ratchet thereby holding the tower at a prescribed elevation while the survey is made.

It is seen that the tower may be erected by one person. As each section is raised the tower is guyed. Thus, at no time is there any danger that the tower will fall. When surveying at an intermediate position, only the uppermost sections are not guyed and the guying of the other section serves to provide the necessary stability.

To lower the tower the reverse operation is carried out. Thus, the pin which engages the uppermost section is released thereby allowing this section to be telescoped and nested within the adjacent section. Succeeding sections are then released and telescoped. It is of course to be understood that by retracting any one of the pins the various sections of the tower may be extended and telescoped in any desired order.

The advantage of such a tower is, of course, that by providing means for extending the outermost sections first it is possible to continuously guy the tower as it is erected. The automatic locking pin eliminates the necessity of a man climbing the tower and manually inserting a pin. Also, the automatic engagement of the inner section by the pin when the section is fully extended and the stops secured to the bottom of each of the tower sections prevents accidentally cranking out of the section. It is obvious that this tower may be rapidly and efficiently erected by one man. This is advantageous since very often only a limited number of men are available. The expenses incurred in surveying work are considerably reduced.

Rather than providing tubular upright members 14 of the type described and which require special saddles to continuously guide the various sections, it may be advantageous to employ special extruded structural members of the type shown in Figures 5 through 13. Referring particularly to Figure 6, the structural members 41 are shown in cross section. Each member has sides 42 and 43 which serve to engage the cross members 44 and diagonal members (not shown) of the reinforcing lattice work. The channels 45 accommodate the rails 46 of the adjacent member. Thus the various sections are continuously guided by this rail and channel arrangement. This provides greater rigidity and simplifies the construction of the telescoping tower. Figure 7 shows a plurality of sections employing extruded vertical members telescoped within one and another. The various sections are locked in extended and telescoped position by means of the latch 48 which is spring loaded 54. The end of the latch 48 engages either the accommodating recess 49 or 51. Thus the latch 48a is shown engaging the recess 51a which is associated with the section 52. The section 52 is locked in its extended position as shown. If the cord 53 is pulled, the latch 48a is disengaged and the section 52 may be lowered until the latch engages the recess 49a whereby the section is locked in its telescoped position. Operation of the tower is the same as previously described.

In certain instances it may be desirable to provide an electrically operated locking mechanism. Thus in Figures 8 through 10 an electrically operated mechanism is shown in conjunction with a tower having extruded members 41. Rather than forming slots 49 and 51 in the various vertical members, holes 56 are formed. The pin 57 engages these openings to lock the sections. The pin 57 is retracted by means of the solenoid 58. The pin is spring-loaded (not shown) to automatically engage the associated hole 56 of the adjacent tower section when the hole lies opposite to the pin. The solenoid may be mounted by suitable means, e.g., by screws 59 to the top of the associated vertical member. Thus, rather than having cords which drop to the ground, the various sections may be released by depressing a switch which applies power to the desired solenoid.

In Figures 11 through 13, a manually operated pin arrangement is shown together with extruded vertical members. By pulling the cord 61 the arm 62 is pivoted about the pin 63 to retract the pin 64. The spring 66 serves to urge the pin inward to engage the associated opening.

It is apparent that locking means of the type shown in Figures 8 through 13 may be used in conjunction with a tower which has tubular vertical members such as shown in Figures 1 to 4. An electrically operated solenoid may be particularly desirable.

By employing a hydraulic lift and solenoid locking means, it is possible to erect and telescope the tower from a remote position. The remote control may be connected to the tower by cable or radio linkage. A hydraulic lift would be associated with the center section. The hydraulic pressure pushing against the stops would stiffen the tower as if it were an integral unit. Thus the tower could be mounted on a truck and controlled from the cab, or it could be located on a mountain and controlled by radio from a distance. The advantages of such a tower are apparent.

Although we have described locking means associated with only one of the vertical members, it is to be understood that more may be employed if the added strength is required. Thus, locking means may be associated with each of the vertical members. Suitable means may then be provided for operating the locking mean associated with each section. For example, if solenoids are used the solenoids may be connected in parallel.

Thus it is seen that we have provided an improved telescoping tower. Particularly the tower includes novel locking means which permit extending and telescoping the tower sections in any desired order. This permits rapid erection and guying of the tower by one person. Further, the tower is adaptable to remote control.

We claim:

A telescoping tower comprising a plurality of tower sections adapted to telescope one within the other, each of said sections comprising at least three upright members reinforced by a latticework of cross and diagonal members, means for guiding said sections within one another as they are extended and telescoped, means for extending said sections, spring projected latch means carried at the top of at least one upright member of each of the outer sections, spaced latch receiving means disposed at the top and bottom of the adjacent upright member of the next innermost section, said latch means and latch receiving means serving to lock the next innermost section in its extended and telescoped position, and means for controlling the latch means operable at the base of the tower when it is fully extended whereby the tower can be extended and telescoped in any desired order.

References Cited in the file of this patent

UNITED STATES PATENTS

| | | |
|---|---|---|
| 133,017 | Davis | Nov. 12, 1872 |
| 2,508,835 | Moon et al. | May 23, 1950 |
| 2,589,080 | Heinish | Mar. 11, 1952 |
| 2,612,242 | Munsinger | Sept. 30, 1952 |
| 2,708,493 | Badertscher et al. | May 17, 1955 |
| 2,739,673 | Foster | Mar. 27, 1956 |
| 2,740,504 | Bailey | Apr. 3, 1956 |
| 2,795,303 | Muehlhause et al. | June 11, 1957 |
| 2,808,912 | Clark | Oct. 8, 1957 |